Figure 1:
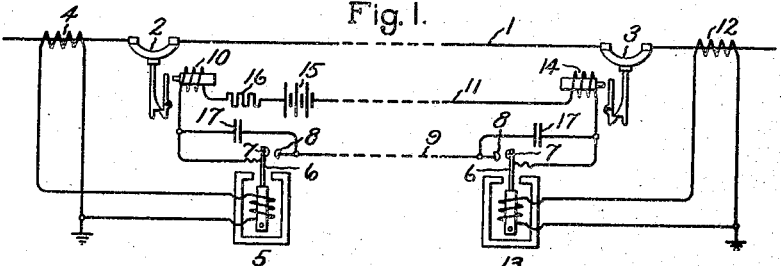

Dec. 6, 1932.  F. J. LANE  1,890,331
PROTECTIVE ARRANGEMENT
Filed June 30, 1931  2 Sheets-Sheet 1

Inventor:
Francis J. Lane,
by Charles V. Tullar
His Attorney.

Dec. 6, 1932.   F. J. LANE   1,890,331
PROTECTIVE ARRANGEMENT
Filed June 30, 1931    2 Sheets-Sheet 2

Inventor:
Francis J. Lane,
by Charles V. Tuller
His Attorney.

Patented Dec. 6, 1932

1,890,331

UNITED STATES PATENT OFFICE

FRANCIS JOHN LANE, OF LONDON, ENGLAND, ASSIGNOR TO GENERAL ELECTRIC COMPANY, A CORPORATION OF NEW YORK

PROTECTIVE ARRANGEMENT

Application filed June 30, 1931, Serial No. 548,018, and in Great Britain July 29, 1930.

My invention relates to improvements in protective arrangements and more particularly to improvements in protective arrangements for isolating a section of a circuit in an electric distribution system or for disconnecting a circuit which may include the windings of electric apparatus in the event of a fault developing in the section or apparatus to be protected.

Systems are known in which the magnitude and phase of the current entering a section of an electric circuit is compared with the magnitude and phase of the current leaving the section, for example, by means of current transformers associated with the conductors at the ends of the section, the secondary windings of which are interconnected by pilot conductors, as in circulating current or opposed voltage systems. With such arrangements, in normal conditions, the output from the secondary windings of the current transformers is balanced, but in abnormal or fault conditions the circuit balance is upset and protective relays are caused to respond, whereby the faulty section or apparatus may be isolated. In such systems, however, difficulties are frequently encountered, first, in obtaining the required state of balance for normal conditions, and second, in view of the capacity currents which tend to flow in the pilot circuit and cause the operation of the protective apparatus under overload conditions on the section which do not necessarily indicate a fault on that section.

The object of my invention is to remove the disadvantages which have been encountered in previous systems of the nature set forth above, and particularly to enable the effect of capacity current in the pilot circuit to be entirely eliminated.

My invention consists in connecting in the pilot circuit elements adapted to move in synchronism with the current at the ends of the section to be protected, the arrangement of these elements being such that the trip coil or coils of a protective circuit breaker or breakers, or a relay or relays adapted to actuate the said trip coils is or are only energized when, owing to a lack of synchronism in the two elements, the pilot circuit is completed and current flows therethrough. The elements adapted to vibrate in synchronism with the currents at the ends of the section are preferably, and will be hereinafter referred to as, vibratory reeds associated with or forming part of an electric relay of known type, but it is to be understood that these may be replaced by other devices adapted to perform the same function such, for example, as synchronous motors provided with suitable commutators.

In the simplest arrangement according to my invention, the reeds are driven by currents obtained from secondary windings of current transformers associated with the ends of the section to be protected and are arranged to be in a state of vibration whenever current is flowing in the protected circuit. In some cases, however, it may be desirable to arrange that the reeds are normally out of action and are only energized on the occurrence of overload conditions which may indicate the presence of a fault on the protected circuit. In such cases, a current may continuously circulate in the pilot circuit and the protective relay or relays or the tripping coil or coils of the protective circuit breakers are then arranged to be unresponsive to such continuously circulating current. On the occurrence of overload conditions which may indicate the presence of a fault on the protected circuit, the vibratory reeds are set into operation and the protective relays will then respond only when the pilot circuit is completed in the event of a lack of synchronism occurring between the vibratory reeds actuated by the currents at the ends of the section.

My invention will be better understood from the following description when considered in connection with the accompanying drawings and its scope will be pointed out in the appended claims.

Figure 2:
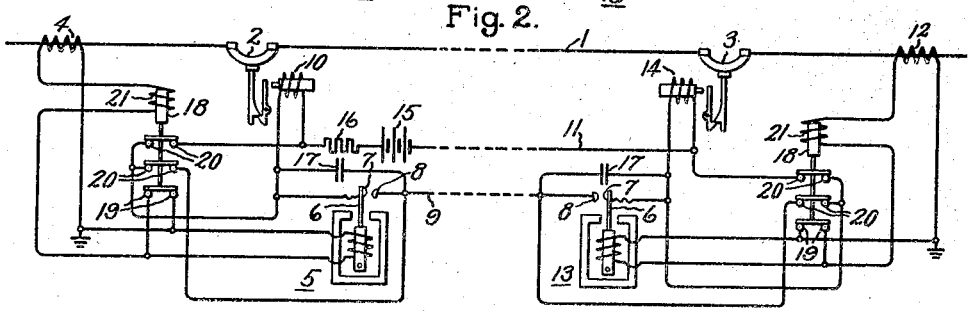
Figure 3:
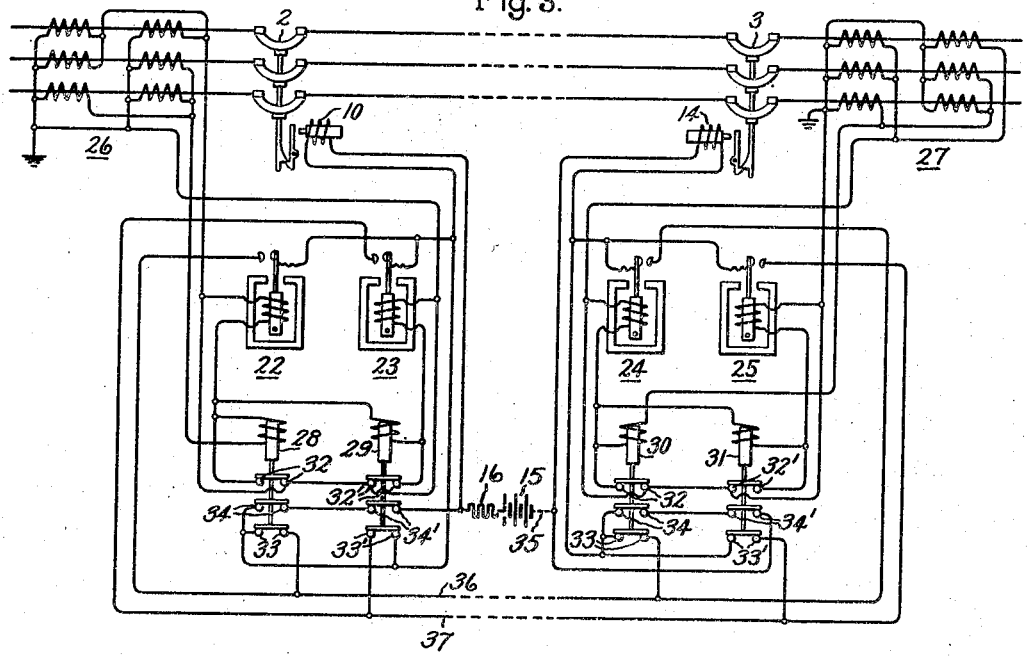
Figure 4:
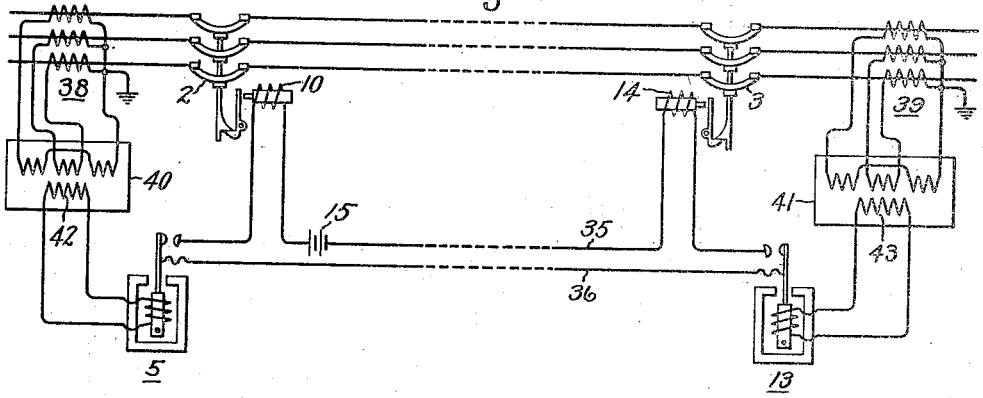
Figure 5:
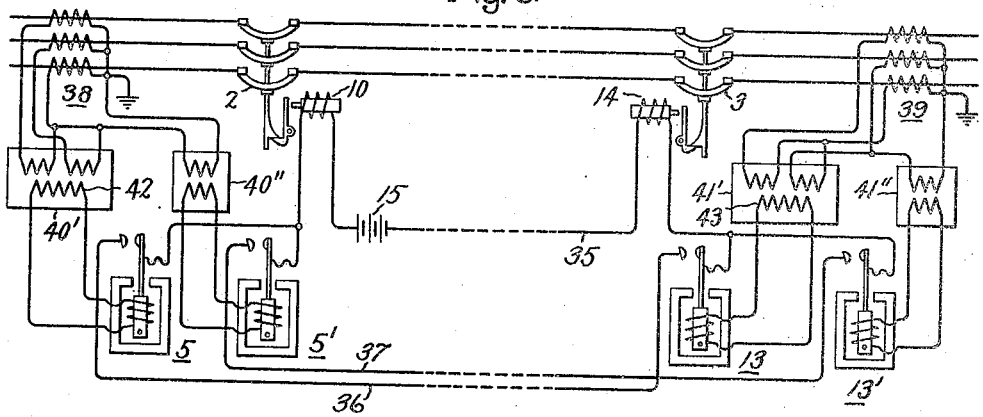
Figure 6:
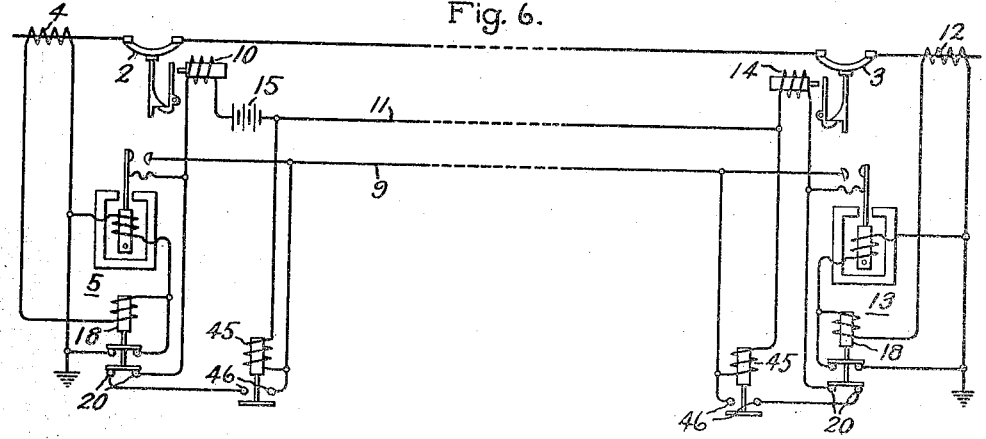

In the accompanying drawings, Fig. 1 diagrammatically illustrates a protective arrangement embodying my invention and shown in single-phase diagram for clearness. Fig. 2 diagrammatically illustrates a modification of the embodiment of my invention shown in Fig. 1. Figs. 3, 4 and 5 diagrammatically illustrate further embodiments of my invention as applied to a three-phase circuit, and Fig. 6 illustrates another modification of my invention in single-phase diagram.

Referring to Fig. 1, I have shown a section of a circuit 1 which it is desired to protect against fault conditions, as limited by circuit breakers 2 and 3. The arrangement shown in this figure is suitable for protecting the circuit when it is adapted to be supplied from both ends, that is to say, when it forms part of a ring main circuit. At the end of the section adjacent the circuit breaker 2, I have indicated a current transformer 4, the output of which is supplied to a frequency responsive means such as a relay 5 having a reed 6 adapted to vibrate in synchronism with the current obtained from the current transformer 4. The relay 5 may be of any suitable construction, examples of which are well known to the art. The reed 6 bears at its end a contact 7 adapted to cooperate with a stationary contact 8 which is connected in one of the conductors 9 of a pilot circuit. The reed 6 is also connected through the trip coil 10 of the circuit breaker 2 to another conductor 11 of the pilot circuit. At the other end of the section adjacent the breaker 3 corresponding apparatus is provided comprising the current transformer 12, vibrating reed relay 13 and trip coil 14, the connections of the relay 13 and the trip coil 14 being similar to those already described in connection with the relay 5. The pilot circuit further includes a source of voltage indicated as a battery 15 and a current-limiting resistance 16. Furthermore, across the contacts of the vibrating reed relay there may be provided condensers 17 for the purpose of reducing sparking. One terminal of the current transformers 4 and 12 is earthed as indicated.

The operation of this arrangement is as follows:

Under normal conditions, that is when the currents entering and leaving the section of the feeder 1 are in phase, the vibrating reeds 6 are oscillating with the same phase and frequency. When the contacts 7 and 8 of the relay 5 are making, the corresponding contacts of the relay 13 are breaking and, consequently, so long as normal conditions are maintained no current will flow in the pilot circuit. When, however, owing to a fault on the protected section, displacement in phase occurs in the currents entering and leaving the section, synchronism between the reeds of the relays 5 and 13 is upset and the contacts of the two relays will be making together for a portion of a cycle with the result that current will flow in the pilot conductors, which will cause the energization of the trip coils 10 and 14 thereby opening the circuit breakers 2 and 3 and disconnecting the faulty section. It is to be understood that the trip coils 10 and 14 may be operated indirectly by relays having their operating coils included in the pilot circuit.

It will be evident that in the arrangement of Fig. 1 the reeds of both relays 5 and 13 vibrate whenever there is current present in the feeder 1, but in the event of feeder 1 being fed from only one end, the vibrating reed relay at the far end will not be energized and therefore the pilot circuit cannot be completed. In order to adapt this arrangement to a circuit fed from one end only, I introduce, as shown in Fig. 2, means for normally rendering the relays 5 and 13 inoperative, such as an auxiliary overload relay 18 arranged in normal conditions to short circuit the coil of the relays 5 and 13, the contacts of these relays and the trip coils of the circuit breakers 2 and 3. For this purpose, relays 18 are provided with contacts 19 and 20 and corresponding cooperating contact members which normally bridge those contacts, contacts 19 effecting the short-circuiting of the operating coils of the vibrating reed relays while contacts 20 effect the short-circuiting of the trip coils of the circuit breakers and the contacts of the vibrating reed relays. Relays 18 each have a winding 21 which is connected to the corresponding current transformers 4 and 12, the winding being energized sufficiently to open contacts 19 and 20 only when a fault current appears on the feeder 1. In these conditions, the connections of the vibrating reed relays are then put into the condition shown in Fig. 1 and the arrangement will then operate in the manner described in connection with that figure.

In Fig. 3 I have shown an arrangement similar to that in Fig. 2 as extended to the protection of a three-phase circuit. In this arrangement two separate vibrating reed relays 22, 23 and 24, 25 are used at each end of the section to give separate phase and earth sensitivity, the relays being actuated by the currents obtained from separate current transformer sets 26 and 27 associated with the phase conductors at each end of the section, each current transformer set comprising double wound current transformers connected by a known method. Each vibrating reed relay has associated with it an auxiliary overcurrent relay 28 to 31 respectively, each overload relay having three separate sets of contacts, of which those associated with overload relays 28 and 29 only will be described. Contacts 32 and 32' of overload relays 28 and 29 are arranged to short-circuit the operating windings of vibrating reed relays 22 and 23 respectively; contacts 33 and 33' are arranged to short-circuit the contacts of vibrating reed relays 22 and 23 respectively; and contacts 34 and 34' are connected in series and are arranged to short-circuit the trip coil 10 of the circuit breaker 2. Corresponding connections are used between the contacts of overload relays 30 and 31 and the vibrating reed relays 24 and 25 respectively. Furthermore, in this arrangement, owing to the use of the three-phase circuit, three individual pilot conductors 35, 36 and 37 are employed instead of the two required in connection with the single-phase schemes shown in Figs. 1 and 2. It will be seen that after the overload relays 28 and 31 have operated, in the event of either the relays 22 and 24 or 23 and 25 vibrating out of synchronism, a circuit will be completed through the pilot conductors and the trip coils 10 and 14 of the circuit breakers 2 and 3. This causes these circuit breakers to open and disconnect the protected section; the contacts of relays 22 and 23 being connected in parallel through the trip coils 10 and 14 by means of the pilot conductors, 35 being the common pilot conductor connecting the trip coils and pilot conductors 36 and 37 respectively connecting the contacts of relays 22, 24 and 23, 25.

In Fig. 4 I have shown an arrangement in which a single vibrating reed relay 5, 13 at each end of the section may be used to give both phase and earth sensitivity in connection with a three-phase feeder. In this arrangement, star-connected current-transformer sets 38, 39 are used at each end of the section and are connected to intermediate summation transformers 40, 41 of the type disclosed in United States Letters Patent 1,776,130, issued September 16, 1930, on an application filed by H. S. Petch. The secondary windings 42 and 43 of these transformers are connected to the vibrating reed relays 5 and 13 which are otherwise connected in accordance with the scheme already described in connection with Fig. 1. Owing to the use of the intermediate transformers 40, 41, the relays 5 and 13 are only energized in fault conditions.

In Fig. 5, which is a modification of the arrangement shown in Fig. 4, the auxiliary summation transformers 40 and 41 have their phase fault and earth fault excitation elements separated into units 40', 40" and 41', 41" respectively, each transformer being associated with a separate vibrating reed relay 5, 5', 13, 13', the contacts of which are connected through three pilot conductors 35, 36, 37, as shown in Fig. 3. Such an arrangement allows separate adjustment of phase and earth sensitivity to be effected.

In the several arrangements shown in Figs. 2, 3 and 4, it is necessary to short-circuit the circuit breaker trip coils by means of normally closed contacts on the overload relay in order to permit tripping of the breaker between the supply source and the fault in the event of the fault being supplied from one end only. In the arrangement shown in Fig. 6, I have provided means whereby both breakers may be tripped open if fault current is fed from only one end.

The arrangement, in general, is somewhat similar to that shown in Fig. 2 and similar reference numerals are employed. In addition to the overload relays 18 at each end of the section, I provide control relays 45 having normally open contacts 46 and their energizing windings connected across the pilot conductors. The contacts 46 are connected in series with the contacts 20 of the overload relays so that the contacts of the vibrating reed relays 5 and 13 are normally open. In the event of a fault occurring on the section fed, for example, from the end nearest the circuit breaker 2, the overload relay 18 associated therewith is energized, its contacts are opened and the relay 5 commences to vibrate. Momentarily then a circuit is completed through the pilot conductors which causes the energization of control relays 45. The current which flows in the pilot circuit, however, owing to the high resistance of the windings of the relays 45, is insufficient to operate the trip coils 10 and 14. At the near end of the section the closing of the contacts 46 of the relay 45 performs no additional function since the contacts 20 of the overload relay 18 are open. At the far end, however, the closing of the control relay contacts 46 effects the short-circuiting of the contacts of the relay 13, thereby completing the pilot circuit and energizing the trip coils 10 and 14 whereby the circuit breakers 2 and 3 are opened.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is,—

1. In combination, an electric circuit energized by alternating current, a pilot circuit extending between two points of said electric circuit, means for controlling said pilot circuit in accordance with the phase relation between the current in said electric circuit at one of said points and the current at the other point including frequency responsive means adjacent each of said points connected to be energized from the circuit to move in synchronism with the current thereof at the respective points, and means for normally preventing the synchronous movement of at least one of said frequency responsive means.

2. In combination, an electric circuit energized by alternating current, circuit interrupting means at each of two points of said circuit, and means for controlling said circuit interrupting means in accordance with the phase relation between the current of the electric circuit at one of said points and the current at the other point including a pilot circuit extending between said points, frequency responsive means adjacent each of said points connected to be energized from the electric circuit to move in synchronism with the current thereof at the respective points for effecting the energization of the pilot circuit on the occurrence of a fault on the electric circuit between said points, and fault responsive means connected to be energized from said circuit for normally preventing the synchronous movement of said frequency responsive means.

3. In combination, an electric circuit energized by alternating current, a pilot circuit extending between two points of said electric circuit, frequency responsive means connected to be energized from said electric circuit for controlling said pilot circuit in accordance with the phase relation between the current in said electric circuit at one of said points and the current at the other point and fault responsive means connected to be energized from said circuit for controlling said pilot circuit on the occurrence of a fault between said points when fed with current from only one point.

4. In combination, an electric circuit energized by alternating current, a pilot circuit extending between two points of said electric circuit, frequency responsive means connected to be energized from said electric circuit for controlling said pilot circuit in accordance with the phase relation between the current in said electric circuit at one of said points and the current at the other point and means for normally rendering said frequency responsive means inoperative to respond to said phase relation.

5. In combination, an electric circuit energized by alternating current, a pilot circuit extending between two points of said electric circuit, means for controlling said pilot circuit in accordance with the phase relation between the current in said electric circuit at one point and the current at another point including a relay at each of said points connected to be energized from the circuit, each of said relays having a member movable in synchronism with the circuit current at the point, and means for normally preventing the movement of the member of at least one of said relays.

6. In combination, an electric circuit energized by alternating current, a pilot circuit extending between two points of said electric circuit, means for controlling said pilot circuit in accordance with the phase relation between the current in said electric circuit at one point and the current at another point including a relay at each of said points connected to be energized from the circuit, each of said relays having a member movable in synchronism with the circuit current at the point and contacts in the pilot circuit controlled by the movable member of the relays, the connection and arrangement of parts being such that the contacts are open when the currents at said points are substantially in phase, and fault responsive relay means connected to be energized from said electric circuit for normally preventing the movement of said relay members.

7. In combination, an electric circuit energized by alternating current, circuit interrupting means at each of two points of said circuit for controlling the circuit, means for effecting an opening of said interrupting means on the occurrence of a fault on the circuit including a pilot circuit extending between two points, means for controlling said pilot circuit in accordance with the phase relation between the current in said electric circuit at one of said points and the current at the other point including frequency responsive means adjacent each of said points connected to be energized from the circuit to move in synchronism with the current thereof at the respective points and contacts in said pilot circuit controlled by said frequency responsive means, and fault responsive means connected to be energized from said circuit for preventing the synchronous movement of said frequency responsive means whereby to prevent the closure of said contacts.

In witness whereof, I have hereunto set my hand.

FRANCIS JOHN LANE.

CERTIFICATE OF CORRECTION.

Patent No. 1,890,331.                                December 6, 1932.

FRANCIS JOHN LANE.

It is hereby certified that error appears in the printed specification of the above numbered patent requiring correction as follows: Page 4, line 75, claim 7, for "two" read "said"; and that the said Letters Patent should be read with this correction therein that the same may conform to the record of the case in the Patent Office.

Signed and sealed this 17th day of January, A. D. 1933.

M. J. Moore,
Acting Commissioner of Patents.

(Seal)